United States Patent [19]

Warning et al.

[11] Patent Number: 4,560,483

[45] Date of Patent: Dec. 24, 1985

[54] PROCESS AND APPARATUS FOR FILTRATION OF OIL AND GAS WELL FLUIDS

[76] Inventors: Theodore J. Warning, 11227 Rippling Meadows, Houston, Tex. 77064; John A. Cairo, Jr., 16826 Shady Arbor La., Baton Rouge, La. 70817

[21] Appl. No.: 606,966

[22] Filed: May 4, 1984

[51] Int. Cl. ............................................. B01D 37/02
[52] U.S. Cl. .................................. 210/777; 210/799; 210/323.2; 210/489
[58] Field of Search ............... 210/777, 778, 791, 798, 210/799, 193, 489, 490, 323.2

[56] References Cited

U.S. PATENT DOCUMENTS 4,269,707  5/1981  Butterworth et al. ............. 210/777
4,388,197  6/1983  Lumikko ............................ 210/777

Primary Examiner—John Adee
Attorney, Agent, or Firm—Pravel, Gambrell, Hewitt & Kimball

[57] ABSTRACT

A filter system using at least two filter vessels with a plurality of filter elements having absolute filtration capability. The filter elements use a nominal filter of diatomaceous earth, or a Perlite filter aid precoat layer, an outer wire layer, an absolute filter layer, a fine wire layer, a coarse wire layer, and a tube core for receiving filter flow therein. A pump is provided for injecting a predetermined amount of filter aid to a precoat tank containing clean fluid. The slurry of filter aid and clean fluid is then pumped into one of the filter vessels for precoating the filtering elements. The unfiltered fluid is then allowed to enter the vessel and be filtered through the filtering elements while virgin filter aid is continuously injected into the unfiltered fluids prior to the fluids entering the filter vessel. One filter vessel is converted to a cleaning mode while the second filter vessel continues filtering in response to a signal in a differential pressure element. The filter vessels are cleaned by backwashing from a pressurized fluid source. The filter vessels are alternately backwashed and coated with the precoating filter aid to provide for a continuous filtering operation.

14 Claims, 5 Drawing Figures

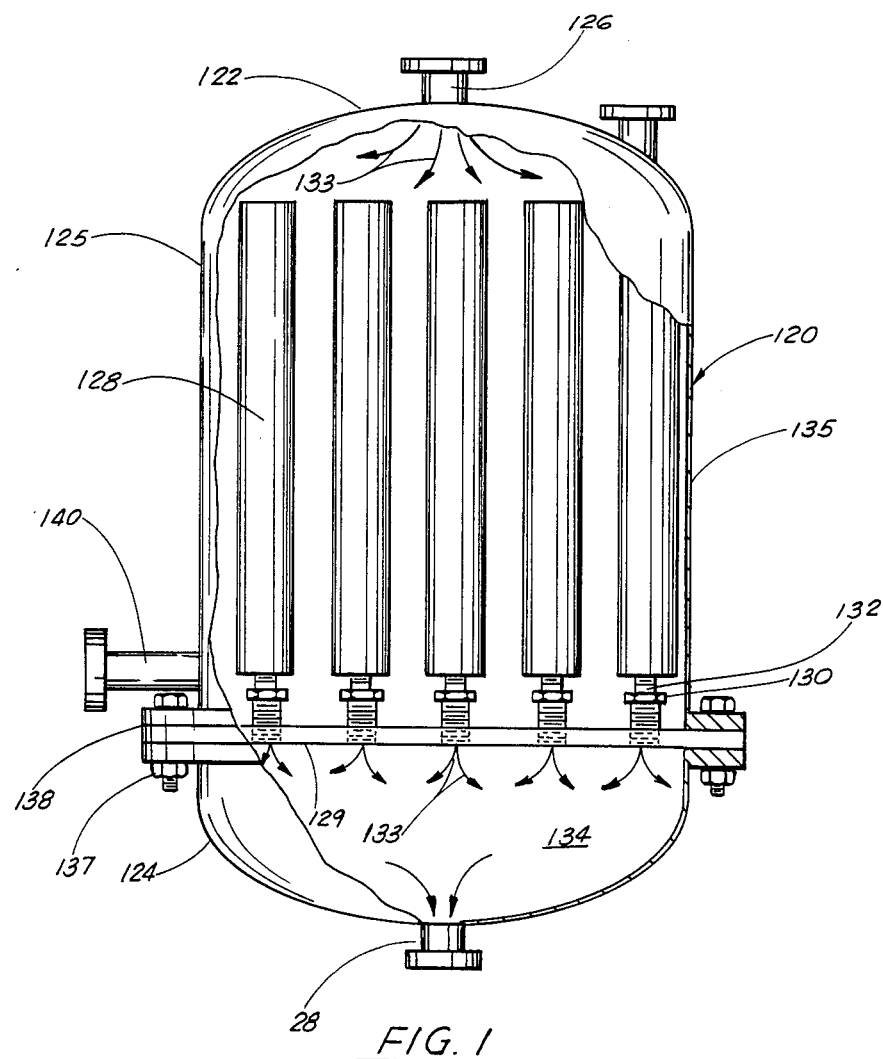
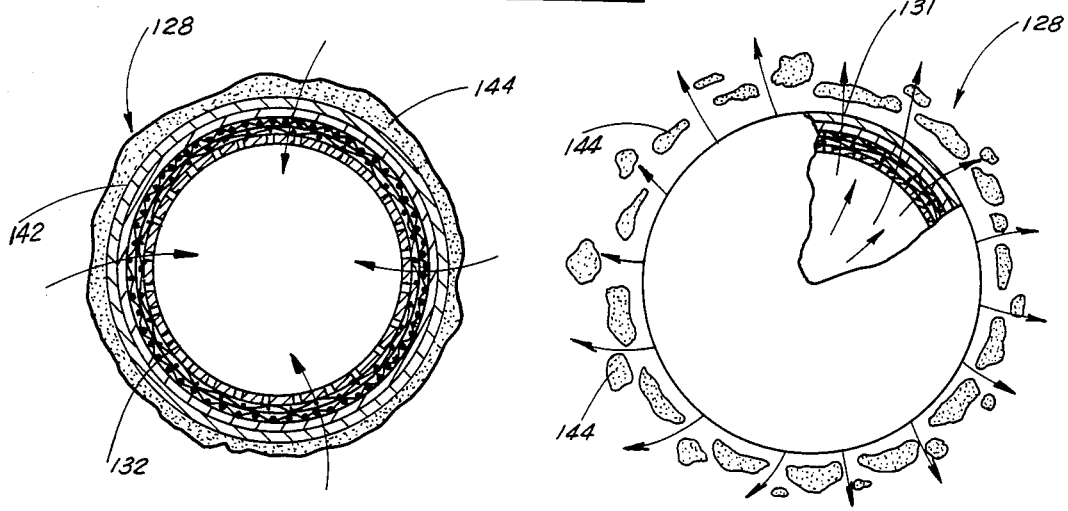
FIG. 1
FIG. 3
FIG. 3A

PROCESS AND APPARATUS FOR FILTRATION OF OIL AND GAS WELL FLUIDS

BACKGROUND OF THE INVENTION

1. Field of the Invention

The apparatus process of the present invention relates to filtration. More particularly, the process and apparatus of the present invention relates to an apparatus and process for filtering completion and workover fluids utilized during oil and gas well drilling and completion operations through a filtration system having a novel filtering element and system including filtering and cleaning capabilities therein.

2. General Background

Completion and Workover Fluids such as Calcium Chloride ($CaCl_2$), Calcium Bromide ($CaBr_2$), and Zinc Bromide ($ZnBr_2$) are utilized during oil and gas well drilling, completion and well workover operations. The virgin completion fluid becomes contaminated with suspended particulates as it is injected into the well bores and subsequently recirculated. The industry has determined that penetration of certain sized suspended solids contained in the fluid during the injection and recirculation procedures may ultimately impair the productivity of the well. When the matrix of the formation is clogged with suspended particles, the formation becomes less permeable and yields are typically lower. In order to avoid this problem, filtration of completion fluids is an accepted practice in the industry.

Basically the industry employs two filtration techniques to remove suspended matter from completion fluids. These are "Multiple Pass" Filtration and "Single Pass" Filtration.

In Multiple Pass Filtration, suspended solids are filtered out by passing the fluid through a series of filter elements having varying particle retention capabilities. The idea is to first remove the larger particles followed then by decreasing retentions until such time that the desired final particle capture is achieved. A typical system would consist of a 50 micron element, followed by a 25 micron, then a 10 micron and finally a 2 micron. The filter elements are fitted into a steel tank commonly referred to a "Pod". Generally the system will have two pods so that one unit can remain in service filtering while the neighboring pod is out of service during filter element replacement. The filter elements are made of various materials including plastic, inorganic, and natural fiber microfilament. The particle retention rating is either by "Nominal" or "Absolute."

The National Fluid Power Association, (NFPA) defines "Absolute Rating," to be determined by the largest, hard, sperical particle that passes through the filter. Nominal retention rating is defined as an arbitrary micrometer value. In essence, this means that a nominally rated filter element may very likely be incapable of retaining particles for which its rating signifies, because nominal rated filters have the common deficiency of passing particles significantly larger in size, let alone particles that it represents to retain. Absolute rated elements will retain particles for which its rating represents provided of course that quality assurance is maintained during the mass production of such filters.

However, due to the expense involved, the use of the absolute element is typically confined to the final step in a multiple pass filtration system. The coarse filtration steps would usually be done with the nominally rated elements.

The replacement type cartridge filter elements, nominal as well as absolute, have by virtue of their physical size and configuration, a rather limited solids loading capability. Therefore, extensive use of cartridge type filters is usually confined to low solids filtration applications.

In those instances where cartridge filters are employed on high solids applications, the resulting short filtration cycles mean frequent element replacement, extensive manual labor and loss of production. In the drilling industry it is very common to have large amounts of suspended solids in the completion fluids, in some instances, as much as several thousand parts per million. A cartridge filter system utilized under these conditions would be very expensive to operate in terms of replacement element cost, labor involved with element changing and time lost during the filter turnarounds. In many instances, added rig time costing as much as $50,000 a day and more is directly attributed to inadequate filtration practices.

Despite the many short comings of the present filter methods, the drilling industry continued to use cartridge filters in the multiple pass systems.

Single Pass Filtration techniques were introduced into the drilling and completions industry in the early 1980's. The industry considered this new method to be a major improvement over multiple pass cartridge filter practices. See SPE 10648 "New Concept-High Density Brine Filtration Utilizing A Diatomaceous Earth Filtration System," Copyright 1982, Society of Petroleum Engineers of AIME.

A single pass concept which employs the use of filter aid material such as Diatomaceous Earth, (D.E.) or Perlite in filter presses and pressure leaf filters are commonly referred to as "D.E. Filters." The term "Single Pass Filtration" denotes the removal of undesirable suspended particulates in a completion fluid by passing the fluid through the filter one time rather than in cascading fashion like the aforementioned multiple pass cartridge filter method. A typical single pass filter is described in U.S. Pat. No. 4,428,425, which would generally comprise a filter press unit consisting of a structural steel framework suited to support a multitude of filter plates. Prior to starting the filtration cycle, the filter plates are compressed together and held securely in place by hydraulic force. The major portion of each filter plate is recessed. As the plates are compressed, the recessed areas form cavities or cake chambers. These cake chambers have a relatively large solids holding capacity. The filter press is therefore conducive to depth filtration and thus considerably much longer filter cycle lengths than cartridge type element filters. The surfaces of the filter plates are covered with a synthetic fabric such as Polypropylene. The function of the filter cloth is to retain the filter aid precoat material which becomes the actual filtering medium once the precoat has been uniformly deposited on the cloth surfaces.

One short coming of this apparatus is that as solids are retained and accumulate on the precoated cloths a rapid pressure differential across the filter will occur and the filtrate flow will be reduced greatly unless permeability of the cake being formed within the chambers is maintained. It should be noted that in those instances where extreme high solids are experienced, the on stream filtration time can be very short, even with proper body aid dosages. The filter press would then have to be pulled off line for cleaning and turnaround just about as often at it is in service filtering. Due to cost considerations and rig space limitations, it is generally impractical to employ standby presses in order to maintain filtration production while the press is in the cleaning and turnaround modes.

In cleaning, air or natural gas passes through the sealed cake chambers driving fluid contained within the press forward. The hydraulic clamping pressure is then released and the head plate is retracted creating an open space inbetween the filter chambers. The plates are then manually indexed, exposing the accumulated solids and precoat contained within the chambers. The operators (normally two are required) then physically remove the solids and precoat by hosing with water and/or scraping the filter cloths. Once cleaned, the press is closed, precoated and returned to the filtration mode. Total down time for cleaning and cycle preparation is approximately one hour. During the precoating, filtering and cleaning functions, the operators must take care in protecting themselves from direct exposure to the fluids to reduce the hazard of chemical burns.

In the present "Single Pass" filtrate art, covered by U.S. Pat. No. 4,428,425, a means for guarding against breakthrough of filter aid and/or solids contaminants is not provided for. Therefore it is common practice to employ a separate filter downstream to serve as a guard filter to capture the breakthrough filter aid and/or solids contaminants. Typically such a guard filter would consist of disposable cartridge filters which can be nominally or absolute rated.

Pressure leaf filters which are also used for single pass filtration are designed around a multitude of filter leaves which can be made of high density plastics and stainless steel. These leaves are available in various shapes and sizes and are covered with either a synthetic cloth or wire mesh cover. The leaf covers serve to retain the filter aid precoat material which is actually the filtering medium, not the leaf cover itself.

The filter leaves are fitted inside of a closed pressure vessel and usually spaced three inches on center, yielding a one inch cake space. The filter vessel can be verticle or horizontal.

During the filtration cycle care must be taken to prevent cake bridging between the filter leaves. Such bridging will often result in severe damage to the leaves to the extent that replacement is required.

When a preset differential pressure is reached and/or filtrate flow appreciably decreases, the unit must be taken out of service for cleaning. The first step in the cleaning operation is to evacuate the "Liquid Heel" from the vessel. The liquid heel is that volume of fluid which occupies the entire capacity of the filter tank. Depending of course on the tank size, the heel can be a sizeable volume of liquid.

The heel is removed from the vessel by introducing air or gas which causes the fluid to be displaced forward, normally to the surface volume tank. During the heel displacement, there is a high probability that much of the spent filter cake will sluff off and go forward to the surface volume tank along with the liquid phase. Since the rig's surface volume tank contains filtered fluid which has already been processed, it is not desirable to put solids back into the tank. In fact, it is counter productive to do so as those solids must ultimately be filtered again. Refiltering the contaminants and filter aid from previous filtration cycles is very costly because additional expensive rig time as well as expensive filtration services are required as a result of poor filter operation practices.

After the heel has been evacuated from the filter vessel, the leaves can be internally cleaned by "Sluicing" or by "Dry Cake Discharge" methods. The sluicing method involves spraying relatively clean liquor, in this case completion fluid already filtered, onto the solids coated filter covers until these solids are removed from cloth surfaces.

Dry cake discharge cleaning involves the mechanical scraping of the solids and precoat material after the liquid heel has been blown forward.

It should be noted that through experience the industry realizes that filter aid and contaminant solids break through may occur in pressure leaf filters much the same as in filter presses previously discussed. In fact the potential for break through is such that guard filters are usually required downstream of the pressure leaf filters. Guard filters are usually cartridge type element pods and in some cases bag filters.

Because of the problems associated with pressure leaf filters as described above, the industry has not to date utilized these types of filters as extensively as they have used filter presses for completion fluids filtration.

SUMMARY OF THE PRESENT INVENTION

The process and apparatus of the present invention solves the problems confronted in the present state of the art in a simple and straightforward manner. What is provided is a filter system consisting of at least two filter vessels having a plurality of filter elements having absolute filtration capability. Said elements have an outer wire layer which is capable of retaining a filter aid precoat followed by an absolute filter layer, fine wire layer, coarse wire layer, and tube care for receiving filter flow therein.

There is further provided means for injecting a predetermined amount of filter aid such as diatomaceous earth, (or Perlite) to a precoat tank containing clean fluid; pumping the D.E. Fluid precoat slurry into at least one of the filter vessels, the D.E. contained in the precoat slurry being retained by the filter elements, for serving as the filtering medium. Following the formation of the precoat layer, unfiltered fluid is allowed to enter the vessel and continued to flow as a body feed pump continuously injects virgin DE into the unfiltered fluids prior to the fluids entering the filter vessel(s). Following the filtering of the fluid, the filtered fluids exit the filter vessel and transfer to clean fluids storage. Upon accumulation of solids, pressure differential across the filter elements increases as suspended solids are removed from the dirty fluids. Said pressure differential means indicates the need to convert one filter vessel in the filtration mode to the cleaning mode for cleaning that particular vessel, while the second vessel continues in the filtration mode. In the cleaning mode air or gas is introduced to the filter by valve means for the purpose of displacing the liquid heel through the filter elements in the direction of normal filter flow. Having passed through all of the element's layers, the liquid heel exits the filter vessel (by valve means) free of solids, a pressurized volume of fluid (usually water) then flows through the filter elements in a reverse flow direction and out of the filter vessel to a valve means. During this action, the cake of D.E. and solids is removed (internally under pressure and untouched by humans) from the filter elements and carried to waste. Following this action, the elements are clean and ready for precoating in preparation for returning to the filtration mode.

Therefore, it is one of the primary objects of the present invention to provide a filter system having filter aid and absolute filtration capability within a single vessel;

It is still a further principal object of the present invention to provide an oil well fluid filtration process which can be placed in the filtration mode and the cleaning mode without coming into contact with the outside atmosphere or the operators;

It is still a further principal object of the present invention to provide a filter system which does not have to be taken off line in order to clean the system during the filtration process;

What is further provided in the aforementioned cleaning mode is a substantially shorter cleaning operation, thus reducing the time that the filter is out of operation;

What is still further provided is a filter system that lends itself to automatic operation.

BRIEF DESCRIPTION OF THE DRAWINGS

FIG. 1 is an overall perspective view of the filter vessel of the apparatus of the present invention;

FIGS. 3 and 3-A are cross sectional top views of the filter medium in the preferred embodiment of the present invention.

DETAILED DESCRIPTION OF THE PREFERRED EMBODIMENT

The process and apparatus of the present invention is illustrated in FIGS. 1 through 4 in the preferred embodiment. In the discussion of the overall invention, reference should be made initially to FIG. 4 for a complete description of the system of the present invention for filtering suspended solids from completion fluids and in a second mode for cleaning the filtering elements of the system at a predetermined point in the process. Except during the period when one filter is in the cleaning mode, all filters will normally be operating in the filtration mode.

Figure 4:
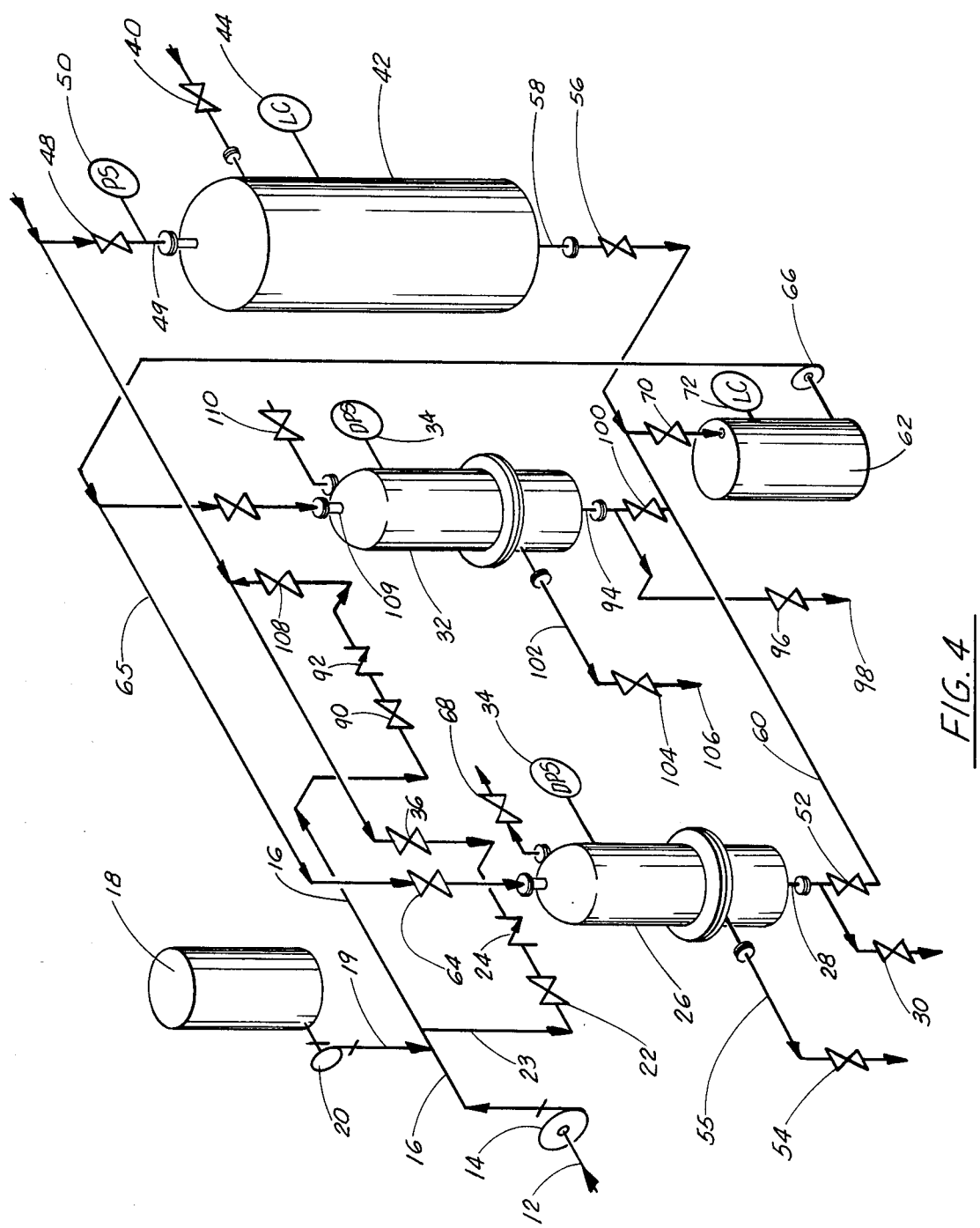
FIG. 4 is an overall system schematic of the preferred embodiment of the system of the present invention.

As seen in FIG. 4, what is provided in the process is an inlet line 12 for allowing the uncleaned completion fluid to enter the system. The uncleaned fluid would move into a pump 14 entering a line 16 for transporting the fluid further into the system. There is then provided a body feed tank 18, which, in the preferred embodiment, injects "virgin" diatomaceous earth into the main line 16, which contains the dirty completion fluids by pumping the diatomaceous earth via body feed pump 20 through line 19 for feeding it into the main line 16. There is provided a first valve 22 contained in an adjuct line 23 feeding the diatomaceous earth containing dirty completion fluid into valve 22 and with valve 22 in the open position allowing the dirty fluids in line 16 to pass through a flow control valve 24 and into first filter vessel 26. The construction and functioning of filter vessel 26 will be described further.

Following the filtering of the dirty fluids through filter 26, the fluids are then released from filter 26 at outlet line 28 and when valve 30 is in the open position allowing the fluids to then exit as cleaned fluids for reusing downhole.

Having described basically the cleaning mode of the system, as seen in FIG. 3, there is provided a second filter 32, which is identical to filter 26, but is used in the alternative when the system is in the cleaning mode as will be described herein.

During the filtering of the dirty fluid through filter 26 or 32, there is existing a differential pressure switch (DPS) 34 which senses the accumulation pressure differential across the filter elements as seen in FIG. 1, as the suspended solids are removed from the dirty fluids during the filtering process. At a predetermined setting, the DPS 34 initates a signal to change that filter 26 or 32 from the filtration mode to the cleaning mode. For purposes of description, it will be assumed that filter 26, in this case, will be the filter which will revert from the filtration to the cleaning mode.

To enter the cleaning mode, as was stated earlier, the DPS 34 would initiate the cleaning mode signal. At that point, valve 22, which is the valve in line 23 for allowing the dirty fluids into the filter 26 would be initated into the closed position, thus stopping the flow of the dirty fluid to filter 26. At this point, a second valve 36 would be moved to the open position, allowing pressurized gas or the like, to enter the filter vessel 26 for purposes of forcing the fluids contained in vessel 26 to be evacuated out of the vessel. This evacuation would be accomplished through forcing the fluids through line 28, valve 30. The diatomaceous earth which has been caked upon the filter elements as will be described further, and the suspended solids caked thereupon would be caused to remain intact on the surfaces of the filter elements, and would not follow the cleaned fluids out of the outlet line 28. Following the forcing of the fluids through the evacuation from filter 26, valve 36 would then be moved to the closed position, thus stopping the flow of the pressurized gas therethrough.

At this point, valve 30 would then be placed in a closed position, isolating completely filter 26 from the cleaning fluids storage through line 28. At this point, an additional valve 40 would be placed in the open position allowing water to fill a pressurizing flush water vessel (PFWV) 42 to a level which has been predetermined as indicated by a level control (LC) monitor 44. Upon reaching a particular level, the level control would then call for valve 40 to be moved to the closed position stopping the flow of water into the PFWV 42.

At this point, an additional valve 48 would be moved to the open position, allowing pressurized gas to pressurize the PFWV to a preselected point as sensed by a pressure switch 50 within line 49 leading to the PFWV 42. Valve 48 is then moved to the closed position, thus allowing PFWV 42 to contain a predetermined level of water under pressure ready for use.

At this point, a valve 52 would be opened thus allowing fluid communication between valve 52 through line 28 into vessel 26. Also, valve 54 would move to the open position allowing fluid communication between valve 54, via line 55 into vessel 26, serving as a means for dumping of waste from vessel 26 through line 55 as will be described further.

Following the opening of valves 52 and 54 in anticipation of the cleaning mode, an additional valve 56 which is contained in the outlet line 58 leading from the lower portion of the PFWV 42 is placed in the open position, allowing the pressurized volume of water in PFWV 42 to travel at high velocity via line 60 through valve 52 and up through the filter elements contained in filter vessel 26, and in a reverse flow direction out of the filter vessel 26 to waste through line 55, valve 54 to be swept away as waste. During this action, the cake of diatomaceous earth and solids, which was caked upon the filter elements contained in filter 26 is removed and carried off. Following this "flushing" of the filter elements via the pressurized fluid, valves 52, 54, and 56 would be moved to the closed position, with the filter elements contained in filter vessel 26 clean and ready for precoating with the virgin diatomaceous earth as it was described earlier.

At this point in the process, a predetermined quantity of diatomaceous earth is added to a precoat tank 62, which would contain clean completion fluid. An additional valve 64 contained in line 65, which interconnects precoat tank 62 and valve 64 and would be moved to the open position, thus allowing fluid from precoat tank via a precoat pump 66, contained in line 65, to move through line 65 into filter 26. Simultaneously, an additional valve 68 would be moved to the open position, thus the fluid contained in precoat tank 62 containing the diatomaceous earth would be pumped as a precoat slurry into filter vessel 26 through line 65 and valve 64. The air being displaced by the entering precoat slurry through line 65 would be vented through valve 68 as it has been placed in the open position. When the filter vessel 26 has been filled with precoat slurry valve 52 is moved to the open position, and an additional valve 70 is also placed in the open position with the precoat slurry contained in filter 26 moving through valve 52, line 60, through valve 70 and back into precoat tank 62. During this process, the precoat slurry has passed through the filter elements contained in filter 26, and the slurry has formed the precoat layer of virgin diatomaceous earth on the elements filtering surface.

Following the predetermined precoat recirculation time of moving the precoat slurry through the filter and back into the precoat tank the filter 26 is then prepared to be returned to the filtration mode as was describe earlier.

Again, at this point, the valve 22 would be placed in the open position allowing once more the dirty fluids to enter filter vessel 26. The precoat pump 66 would then stop, with valve 64 moved to the closed position. At this point, filter fluid is allowed to continue to flow to the precoat tank through valve 52 and 70, thus refilling the precoat tank to the desired level as required for the next precoat operation.

Again, the precoat tank 62 level control 72 (LC) senses when the correct level is reached at which point valve 30 would be placed in the open position, valve 52 would be in the closed position and valve 70 would be placed in a closed position. Filter 26 has now been returned to the filtration mode.

Of course, as seen in FIG. 4, this particular process of cleaning would alternate between filters 26 and 32. Thus, when the filter 26 is placed in the cleaning mode, following the closing of valve 22, valve 22 and the cleaning mode begun for filter 26, valve 90 within the continuation of line 16 would remain in the open position, and flow control 92 within line 16 would allow the dirty fluids to pass into filter 32 and be filtered out of outlet line 94 when valve 96 is placed in the open position with the fluids collected as clean fluids at 98.

Of course, when filter vessel 26 has been returned to the filtering mode once more, then filter vessel 32 can be cleaned when the DPS 34 for filter 32 initiates the cleaning signal. Filter 32 is changed to the cleaning mode by placing valve 90 in the closed position, PFWV 42 is again pressurized, and with valve 56 placed in the open position and additional valve 100 placed in the open position the pressurized fluids will then move up through line 94 into vessel 32, thus cleaning out the diatomaceous earth precoat and the suspended solids through line 102 once valve 104 is then placed in the open position, with the collection through line 102 going to waste at 106. Like in the previous filter, upon the cleaning of the filter elements in this manner, valve 56 and 100 are placed in a closed position, additional valves 108 and 110 are placed in the open position, thus allowing precoat slurry to enter filters 32 via line 109 and the air to be vented via valve 110. following this recirculation of precoat slurry through the filter, the diatomaceous earth again collects on the filter elements, and the filter has been returned to the filtration mode and the cycle would repeat itself once more.

Figure 2:
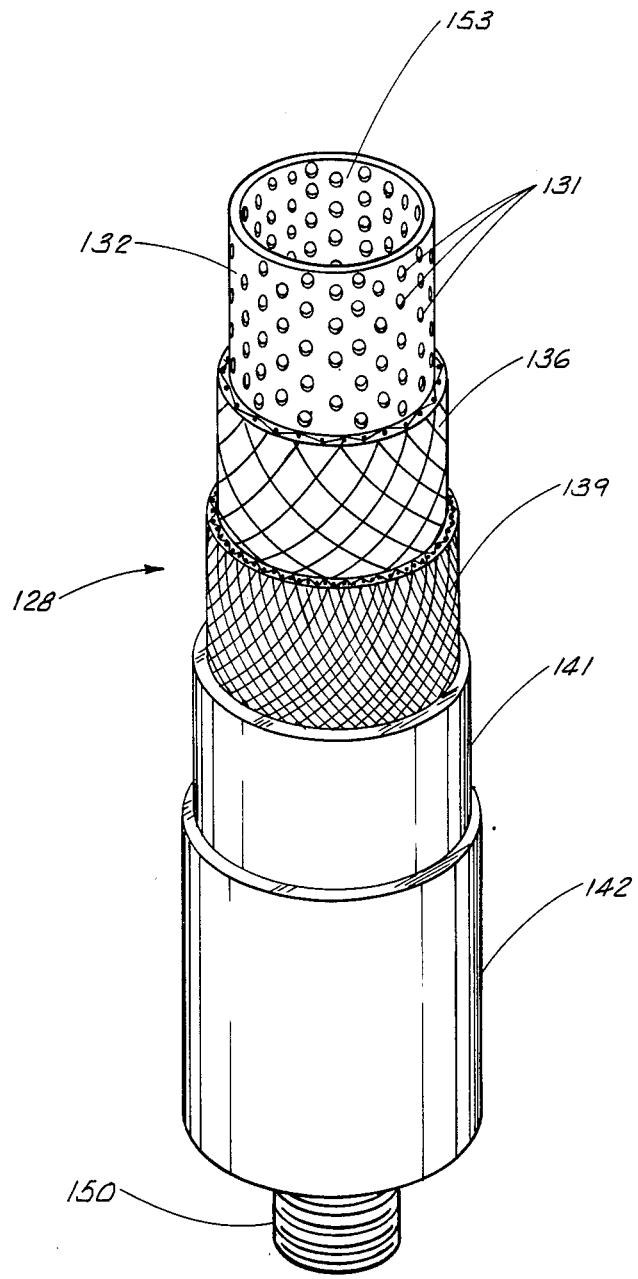
FIG. 2 is a cross sectional side view of the filter element in the apparatus of the present invention.

Turning now to FIGS. 1, 2 and 3, which represent the filter vessel and filter element respectively, FIG. 1 illustrates a filter vessel 120, which is substantially a circular vessel having a convex top portion 122 convex bottom portion 124, with the continuous circular wall 125, top portion 122 and bottom portion 124 defining a filter vessel therewithin. As seen in FIG. 1, filter vessel 120 contains an inlet 126, which allows a flow of fluids therein to be entered into the top portion of vessel 120. As seen in FIG. 1, the vessel 120 contains a plurality of filter elements 128, which are substantially in the upright position the composition of which will be described further. Each of said filter elements is mounted into the vessel via a base mount 130, which would comprise a threaded bolt upon which an interior core tube 132 extends throughout the length of the filter element 128, the tube 132 having a plurality of perforations 131 therethrough for allowing the flow thereinto. As seen via ARROWS 133, dirty fluids entering through line 126 would move into the interior of the fluid vessel 120 and would be filtered around the outer portion of the filter elements 128 into the interior of hollow tube core 132 passing into the tube core via the plurality of perforations 131. Thus the cleaned fluid would then move downward through the interior of the tube core into the bottom portion 134 of the vessel and through the outlet line 28 into the cleaned fluids area. Flow of unfiltered fluids into bottom portion 134 is prevented by solid plate 129 so that all fluid flow is directed through filter elements 128 and base mounts 130 into bottom portion 134 as indicated by ARROWS 133. As seen in FIG. 1, the bottom portion 134 is rigidly connected onto the upper portion 135 which would rigidly interconnect the upper and lower portions of vessel 120 at flange 138, but upon removal of bolts 137 would allow access to the interior of upper portion 135 for servicing or changing the filter elements 128. The vessel further contains a drain line 140 which would be utilized during the cleaning mode of the vessel wherein the collected earth and suspended solids that have been collected onto the filter elements during the filtration mode would be washed out as was described earlier through drain line 140 into the waste area of the rig.

Turning now to the particular filter elements as was described earlier, a typical filter element as illustrated in FIGS. 2 and 3 would comprise a base 150 which would be threadedly engageable to the base mount 130 of the lower portion of vessel 120, each of said base mounts accomodating an individual filter element and having a bore therethrough for allowing the flow of fluid downward that has been filtered, as was described earlier. As seen in FIG. 2 there is further provided the interior core tube 132 which is substantially a rigid metal tube or the like which would extend substantially from the threaded connector portion of the filter element 128 up through its entire length through the top portion of filter 128 wherein it would be sealed via a cap or cover 153, which would disallow the flow of fluids thereinto from the top. As was described earlier also, the tube core 132 would provide a plurality of perforations 131 throughout its entire circumferential wall surface for allowing the flow of fluid therethrough and downward through its inner core into the bottom portion 134 of the vessel which was described earlier.

The primary filtering means would comprise a plurality of filter elements 128, each of filter elements 128 further comprising a multi-layer filter means enveloping the tube core 132. The filter means would comprise an inner coarse wire layer 136, fine wire layer 139, an absolute filter layer 141, an outer wire layer 142, and the diatomaceous earth layer 144. In describing the function of the filter means 128, particular attention should be brought to the fact that the filter means 128 accomplishes within one single filter means both the primary filtering process and absolute filtering as is not presently seen in the art. Outer wire layer 142 is generally a coarse wire layer adapted specifically for an adhesion means allowing the diatomaceous earth to adhere thereto to serve as a principal nominal filtering means 144. Absolute filtering means comprises the second or absolute filter layer 141 within each filter element, and provides generally a metallic fabric layer for filtering all particles having the diameter greater than the "absolute" rating of said layer. The next layer comprises a fine wire layer 139, adjacent a next inner coarse wire layer 136, which is adjacent the perforated tube core 132. This multi-layered filter means 128 accomplishes both a primary and absolute filtration needs of the system.

There is provided an initial layer adjacent the outer wall tube core 132 which would be a coarse wire mesh of 136 as a filter element maintaining means, the second most center layer would then be a fine wire layer 139 providing additional means for maintaining the filter element and the filter element itself would comprise an absolute filter layer 141 which would be rated on an absolute scale for allowing only particular sized particles therethrough. The outer most layer of the filter element would then be an outer wire layer 142, which would be the outermost portion of filter 128. The outer wire layer 142 would be particularly arranged so as to accomodate the layer or the primary filter layer of diatomaceous earth which would adhere to the outer portion of each filter element to serve as the initial filtering means through the filter element itself in conjunction with the absolute filter layer 141.

FIGS. 3 and 3-A further illustrate top cross sectional views of the filter means 128 of the apparatus of the present invention. What is provided in FIGS. 3 and 3-A are views of the filter means 128 during both the filtering and the backflushing of the filter mediums within filter means 128 and various stages of the process. As seen in the figures, filter aid such as diatomaceous earth 144 or the like in FIG. 3 is being carried onto and adheres to the outer most wire layer 142, filter means 128 and thus will serve as a primary filtering means following the diatomaceous earth 144 being adhered to outer wire layer 142. The accumulation of solids upon the diatomaceous earth layer 144, will reduce the filtration flow capabilities of the filtration means 128, and thus is illustrated in FIG. 3-A, there is depicted the backflushing of filter means 128 by injecting fluid through core tube member 132, wherein the fluid is forced outward through perforations 131 through the various layers of the filter until the diatomaceous earth layer 144 is forced away from outer wire layer 142, and is then flushed out of the filter tank 120 through drain 140 and for waste into valve 54.

It should be noted that due to the presence of at least two filter vessels, each having the ability for filtration, in the preferred embodiment of the system, a first vessel would be put "on line" to begin the filtering process, for which time, for example, an hour following, the second vessel would be placed on line, with each vessel filtering at a rate substantially equal to the second vessel. At the time that the first vessel which is placed on line needs to be backwashed, it is simply taken off line, and the second vessel continues to achieve the filtration during the process. Therefore, the system has the capability of achieving continuance filtration of completion fluids or the like, without having to shut down the filtration during the cleaning of the system. This principal of continuace filtration would apply for a plurality of filter vessels utilized in addition to the two vessels as seen in the system.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for filtering a contaminated oil/gas well fluid stream, comprising the steps of:
    a. providing a filter vessel;
    b. introducing a fluid containing filter media into the vessel;
    c. forming a primary filter cake with the filter media inside the vessel;
    d. supporting the primary filter cake on the outside surface of a continuous support screen having sufficient structural integrity to prevent screen aperture deformation under increasing pressure differential after solids accumulation thereupon;
    e. introducing contaminated oil/gas well fluids into vessel;
    f. removing solid material that flows downstream from the media with a secondary guard filter that is positioned in the vessel adjacent the continuous support screen; and
    g. withdrawing filtrate from the downstream side of the filter media, the support screen, and the secondary guard filter.

2. The process in claim 1, wherein the secondary filter has an NFPA "absolute rating."

3. The process in claim 1, wherein the continuous support screen defines a substantially cylindrical annular support surface having a fluid flow bore therein for receiving filtrate downstream of said filter media, the support screen, and the secondary guard filter.

4. The process in claim 1, further comprising the step of back flushing the filter vessel as a means of cleaning the filter vessel following filtration.

5. The process in claim 2, wherein the NFPA absolute rating achieves filtration of all impurities above the absolute rating of the filter.

6. A process for removing particulate material from oil/gas completion or workover fluids, comprisng the following steps;
 a. providing at least a first vessel for injecting uncleaned oil/gas completion or workover fluids thereinto;
 b. providing filter means within the filter vessel, the filter means including in part a continuous annular support screen having sufficient structural integrity to prevent screen aperture deformation under increasing pressure differential after solids accumulation thereupon;
 c. introducing a fluid containing filter media into the vessel to form a primary filter cake along the outside annular surface of the continuous support screen;
 d. providing a secondary guard filter positioned adjacent and downstream the continuous support screen;
 e. introducing contaminated oil/gas well fluids into the vessel; and
 f. withdrawing uncontaminated oil/gas well fluid filtrate from the downstream side of the filter media, the support screen, and the secondary guard filter.

7. The process in claim 6, wherein said primary filter cake is diatomaceous earth.

8. The process in claim 6, wherein the secondary guard filter comprises a NFPA "absolute rated" filter screen.

9. The process in claim 6, wherein there could be provided a plurality of filter vessels in the filtering process.

10. An apparatus for filtering oil/gas completion or workover fluids, which comprises;
 a. a filter vessel;
 b. filter means in said vessel, said filter means further comprising at least a primary filter cake supported on the outside surface of a continuous support screen having sufficient structural integrity to prevent screen aperture deformation under increasing pressure differential after solids accumulation thereupon;
 c. a secondary guard filter positioned adjacent and downstream of the continuous support screen in the vessel; and
 d. means downstream of the filter media, the support screen and the secondary guard filter to allow withdrawal of filtrate from the vessel.

11. The apparatus in claim 10, wherein the filter media, support screen and secondary guard filter are supported around an annular perforated tube member for receiving fluid flow therein.

12. The apparatus in claim 10, wherein the filter vessel is substantially a closed vessel with no exposure to the outside atmosphere.

13. The apparatus in claim 10, wherein there is further provided additional filter vessels as required.

14. The apparatus in claim 10, wherein the primary filter cake is comprised of diatomaceous earth.

* * * * *